(12) United States Patent
Liu et al.

(10) Patent No.: US 9,709,464 B2
(45) Date of Patent: Jul. 18, 2017

(54) DRUM FOR SIMULATING ROAD SURFACES

(71) Applicant: CITIC Dicastal CO., LTD, Qinhuangdao (CN)

(72) Inventors: Chunhai Liu, Qinhuangdao (CN); Shide Li, Qinhuangdao (CN); Zhigao Yin, Qinhuangdao (CN); Qiang Liu, Qinhuangdao (CN); Hongwei Sheng, Qinhuangdao (CN); Yiwu Du, Qinhuangdao (CN); Yongning Wang, Qinhuangdao (CN); Zhihua Zhu, Qinhuangdao (CN); Changhai Li, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 52 days.

(21) Appl. No.: 15/019,340

(22) Filed: Feb. 9, 2016

(65) Prior Publication Data
US 2016/0231200 A1   Aug. 11, 2016

(30) Foreign Application Priority Data

Feb. 11, 2015   (CN) .......................... 2015 1 0075011

(51) Int. Cl.
*G01M 17/02*   (2006.01)
*G01M 17/007*   (2006.01)

(52) U.S. Cl.
CPC ...... *G01M 17/022* (2013.01); *G01M 17/0074* (2013.01)

(58) Field of Classification Search
None
See application file for complete search history.

(56) References Cited

U.S. PATENT DOCUMENTS

| | | | | |
|---|---|---|---|---|
| 4,593,557 A | * | 6/1986 | Oblizajek | G01M 17/022 73/146 |
| 2014/0109662 A1 | * | 4/2014 | Koide | G01M 17/022 73/118.01 |
| 2016/0282286 A1 | * | 9/2016 | Mashita | G01N 23/04 |

* cited by examiner

*Primary Examiner* — Andre Allen
(74) *Attorney, Agent, or Firm* — Maier & Maier, PLLC

(57) ABSTRACT

The present invention provides a drum of a wheel tester, which is characterized in that an outer surface of the drum has cyclic corrugations parallel to a cross section of the drum, wherein the cyclic corrugation in one cycle on the outer surface is composed of a concave arc and a convex arc, both of which are tangential in ends and equal in diameter, and one cycle is 30 to 50 mm in length and 1 to 1.5 mm in depth. The drum is easy to machine, reduced in cost, increased in friction force and suitable for simulating various road surfaces.

10 Claims, 2 Drawing Sheets a) Shape of drum       b) Partial surface of drum

DRUM FOR SIMULATING ROAD SURFACES

TECHNICAL FIELD

The present invention relates to the field of automobile wheel and tyre tests, and in particular to a drum for simulating road surface conditions

BACKGROUND ART

After automobile wheels and tyres are manufactured, performance tests need to be performed. In a performance test, in order to test environments and driving conditions of various road surfaces, a wheel road simulating bench is generally used for a simulation test. The automobile wheel road simulating bench test is the most advanced international testing technology that can replace a wheel road test. The surface (the simulated road surface) of a drum drives a wheel to rotate, and meanwhile, the wheel may simulate a turning action. With a friction force between the drum and the wheel, the test bench provides a radial force load for the wheel during straight running and a lateral force load for the wheel during turning. Therefore, the size and surface pattern shape of the drum play a crucial role in providing test loads.

In this field, the friction force is generally increased by adopting a combination type drum pattern. For example, in the invention patent "Improved Drum of Wheel Tester" (CN201220654005.2), the drum is improved from a smooth surface to a surface in a shape with patterns, which obviously increases the lateral friction coefficient of the surface of the drum. In such a drum, corrugated lines are firstly machined on the surface of the drum, and then fine lines are machined on the basis of the corrugated lines, so as to increase the frictional force. However, such drum has the defects of great difficulty in machining pattern outlines on the surface of the drum and poor wear resistance of fine surface corrugations (arc-like projections). During actual application, the fine surface corrugations will be rubbed down in a very short time, which greatly impacts the stability of the surface performance of the drum.

SUMMARY OF THE INVENTION

To overcome the above technical problems, an object of the present invention is to provide a novel drum for simulating road surface conditions, hoping to overcome the defects of short service life and great machining difficulty of the drum in the prior art, and simultaneously hoping to meet the requirement on conformity of the actual running with a test principle and achieve a further improved capability in providing a lateral friction force compared with the drum in prior art.

To achieve the object described above, the present invention provides the following technical solution.

In one aspect of the present invention, a drum of a wheel tester is provided, and is characterized in that an outer surface of the drum comprises cyclic corrugations parallel to a cross section of the drum, wherein the cyclic corrugation in one cycle on the outer surface is composed of a concave arc and a convex arc, both of which are tangential in ends and equal in diameter; one cycle is 30 to 50 mm in length and 1 to 1.5 mm in depth; and a material for the drum is carbon steel.

In one preferable aspect of the present invention, the drum is 1700 to 3200 mm in diameter and 400 to 600 mm in width.

In one preferable aspect of the present invention, the drum is 1800 to 2200 mm in diameter; a corrugation cycle is 30 to 50 mm in length; and the corrugations are 1.1 to 1.4 mm in depth.

In one preferable aspect of the present invention, the drum is 1900 to 2100 mm in diameter; a corrugation cycle is 32 to 42 mm in length; and the corrugations are 1.1 to 1.4 mm in depth.

In one preferable aspect of the present invention, the drum is 2000 mm in diameter; a corrugation cycle is 32 to 42 mm in length; and the corrugations are 1.3 mm in depth.

In one preferable aspect of the present invention, the drum is 2000 mm in diameter and 450 mm in width; a corrugation cycle is 36 mm in length; and the corrugations are 1.3 mm in depth.

In other aspects of the present invention, a technical solution is also provided as follows: an external form with lines is machined on the outer surface of the drum, which is made of a material of carbon steel and has the diameter of 2000 mm, along a surface width direction of the drum by virtue of a machining manner. The outer surface of the drum with lines can improve a friction force between a tyre and the drum, and therefore, a greater lateral force of the wheel can be obtained during testing. The machining manner and shape of the lines are as follows: a numerical control machine is used to machine cyclic smooth corrugated lines on the outer round surface of the drum.

In other aspects of the present invention, a technical solution is also provided as follows.

In one aspect of the present invention, a drum of a wheel tester is provided, and is characterized in that the drum is made of carbon steel and has a surface including a wear-resistant alloy layer.

In one preferable aspect of the present invention, a wear-resistant alloy is sprayed with an electric arc spraying technology.

In one preferable aspect of the present invention, the wear-resistant alloy is 7Cr13 superhard wear-resistant alloy.

In one preferable aspect of the present invention, the wear-resistant alloy layer is 0.3 mm to 0.5 mm in thickness.

In one preferable aspect of the present invention, the wear-resistant alloy layer is 0.4 mm in thickness.

In other aspects of the present invention, a technical solution is also provided as follows.

After the drum is machined completely, an electric arc spraying technology is applied to spray a 7Cr13 superhard wear-resistant alloy onto the surface of the drum, with the thickness being about 0.3 mm to 0.5 mm.

A novel drum of a wheel tester is also provided, with the diameter of 2000 mm, and is characterized in that cyclic corrugations are distributed on the surface of the drum, and the corrugations take a shape of a plurality of segments of smooth arcs. The surface of the drum is covered with a wear-resistant coating.

In one preferable aspect, the outer surface of the drum has one cycle of corrugation every 36 mm of the width along a width direction of the surface of the drum.

In one preferable aspect, the corrugations are 1.3 mm in depth and take a shape of a plurality of segments of smooth and tangential arcs, with arc diameter being 62.63 mm.

In one preferable aspect, the surface of the drum includes a coating made of a material of 7Cr13 superhard wear-resistant alloy, which is sprayed onto the surface of the drum with an electric arc spraying technology to form a wear-resistant layer with the thickness being 0.3 mm to 0.5 mm.

The drum provided by the present invention has the beneficial effects of being reduced in machining difficulty, increased by 14% in the capability of providing the friction force and prolonged by 3 to 4 times in wear-resistant life compared with that in the prior art. Compared with the prior art, the drum provided by the present invention has the following improvements that the diameter of the drum is increased to improve a contact area between the drum and the wheel to increase the friction force; corrugated shapes of the surface of the drum are changed; and the electric arc spraying technology is applied to add a rough coating of a wear-resistant material on the surface of the drum. Through tests, the drum provided by the present invention is greatly reduced in the difficulty in machining an external form, the added surface coating improves the surface wear resistance of the drum by 3 to 4 times, and the capability of providing the lateral friction force is improved by 14% for the drum.

A novel drum of a wheel tester is provided and has a surface on which arc corrugations with the distribution cycle of 36 mm and the depth of 1.3 mm are distributed along a width direction of the drum. The surface of the drum is coated with a wear-resistant material being 0.3 mm to 0.5 mm in thickness with an electric arc spraying technology, This drum is easy to machine, and is improved by 14% in the capability of providing the friction force and prolonged by 3 to 4 times in wear-resistant life compared with that in the prior art.

In other aspects, applications of the drum described above to an automobile wheel biaxial fatigue test and a road load spectrum simulating test are also provided.

BRIEF DESCRIPTION OF DRAWINGS

In the following, embodiments of the present invention are explained in detail in combination with drawings, wherein.

DETAILED DESCRIPTION OF THE INVENTION

Embodiment 1

Preparation of Drum

A carbon steel drum is 1700 mm in diameter and 500 mm in width. An outer surface of the drum is provided with cyclic corrugated lines along a width direction of the surface, and arcs are provided on the corrugated lines, thereby forming that big corrugated lines include small arcs in a macroscopic axial direction of the drum. 13 cyclic corrugations are distributed on the surface of the drum, with the corrugations being 1 mm in depth; the corrugations take a shape of a plurality of segments of smooth and tangential arcs; 6 small projecting arcs with a chord length being 6 mm are distributed on a corrugated line in one cycle; the projecting height of each small arc is 0.2 mm; and a fillet R2 exists at an adjoined part between every two arcs. The drum manufactured according to the method is denoted as Group 1.

Figure 1:
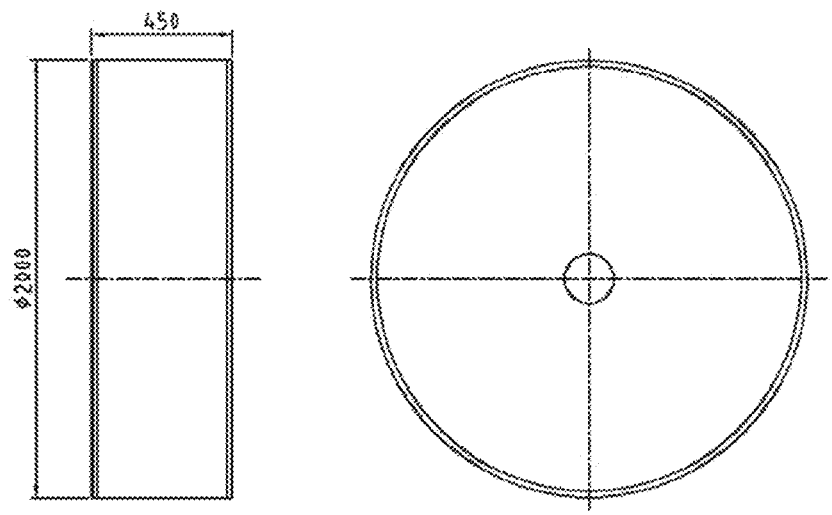
FIG. 1 is an overall schematic diagram of a drum of Embodiment 1 of the present invention.

A carbon steel drum is 2000 mm in diameter and 450 mm in width (see FIG. 1). On the basis of the carbon steel drum, a 7Cr13 superhard wear-resistant alloy (which is purchased from Beijing Dongfang Jingge Scientific Development Co., Ltd.) is evenly coated on the surface of the drum with an electric arc spraying technology to form a wear-resistant coating with the thickness being 0.3 mm to 0.5 mm, and the drum is denoted as Group 2.

Figure 2:
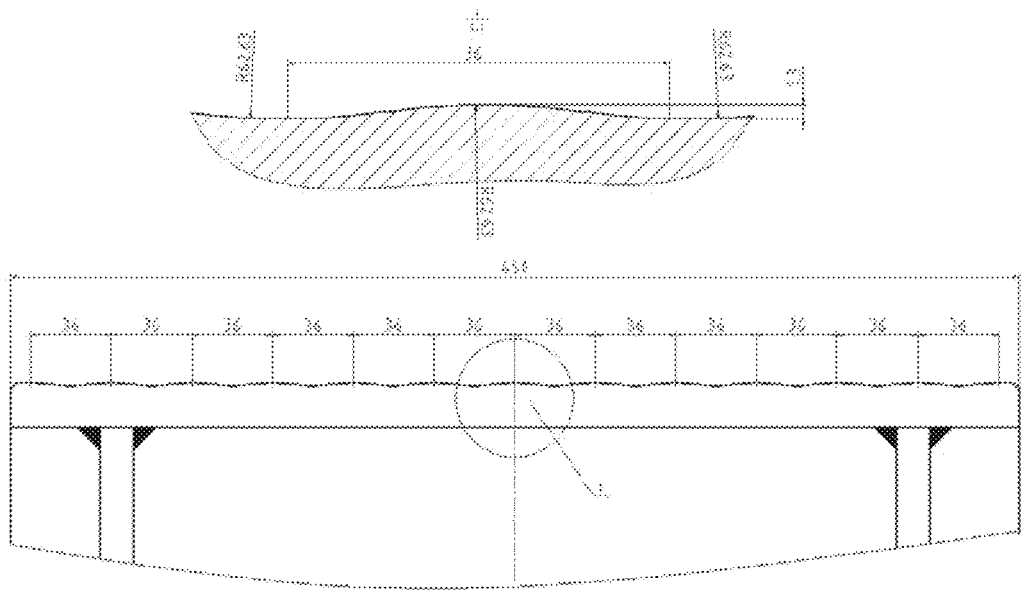
FIG. 2 is a schematic diagram of corrugation distribution of a drum of Embodiment 1 of the present invention.
Figure 3:
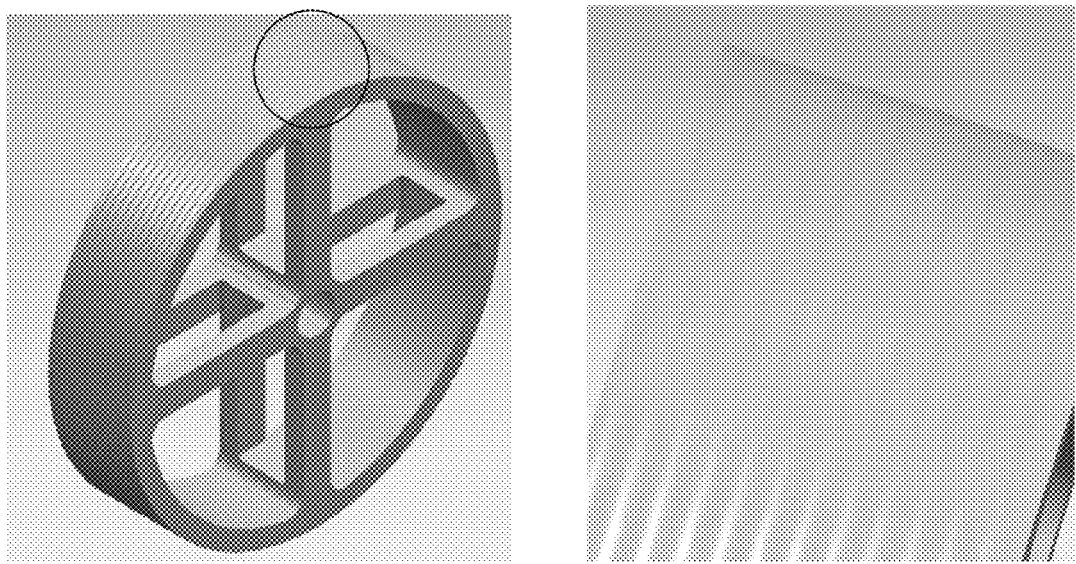
FIG. 3 is a stereoscopic schematic diagram of a drum from Group 1 of Embodiment 1 of the present invention.
Figure 4:
FIG. 4 is an effect obtained after a test sample is sprayed with 7Cr13 through electric arc spraying in the present invention.

The surface of a drum with the diameter of 2000 mm and the width of 450 mm is subjected to machining to form lines, and the specific dimension of the lines is as follows: cyclic corrugations are distributed along an axial direction on the surface of the drum. In one cycle on the outer surface, the corrugation is composed of a concave arc and a convex arc, which are tangential in ends and equal in diameter. The corrugations are 36 mm in width and 1.3 mm in depth and take the shape of a plurality of segments of smooth arcs (see FIG. 2). The drum manufactured according to the method is denoted as a Group 3.

The 7Cr13 superhard wear-resistant alloy is evenly coated on the surface of the drum from Group 3 with an electric arc spraying technology to from a rough wear-resistant coating with the thickness being 0.3 mm to 0.5 mm, and the drum is denoted as Group 4.

The surface of the carbon steel drum with the diameter being 2000 mm and the width being 450 mm is subjected to machining to form lines, and the specific dimension of the lines is as follows: cyclic corrugations are distributed along an axial direction on the surface of the drum. In one cycle on the outer surface, the corrugation is composed of a concave arc and a convex arc, which are tangential in ends and equal in diameter. The corrugations are 36 mm in width and 2 mm in depth. The drum manufactured according to the method is denoted as Group 5.

Embodiment 2

Friction Force Test

The drums from the above Groups 1 to 5 are mounted on a wheel road simulating bench to simulate road surfaces with the surfaces of the drums. Wheel tyre assemblies are pressed on the surfaces of the drums, and a certain turning angle is set for each. The test bench is started to rotate, and an axial force (i.e. an axial component of a friction force produced between the surface of each drum and each tyre) applied to each wheel is measured. The friction force test is performed by using the following working conditions.

Wheel and tyre: 17 inch wheels and 225/50R17 radial tyres (with tyre pressure of 450 kPa) are used.

Setting of contact-face pressure: 17,000N (maximal static load of common 2.5-fold wheel).

Setting of speed: 60 km/h. Setting of turning angle of wheel: 5°.

The magnitude of the axial force (i.e. an axial component of a friction force between the surface of each drum and the tyre) applied to the wheel is measured.

Results show that the friction forces of the drums from Groups 3, 4 and 5 are improved obviously, as shown in Table 1 specifically.

TABLE 1

Friction force (N) parameter of drums from Groups 1 to 5

| Group No. | Surface characteristics of drum | Lateral friction force (N) | Increase over Group 1 |
|---|---|---|---|
| 1 | Diameter of 1700 mm and big and small corrugations, without coating | 7055 | |
| 2 | Diameter of 2000 mm and no corrugations, with coating | 6937 | −1.67% |
| 3 | Diameter of 2000 mm and corrugations with width of 36 mm and depth of 1.3 mm, without coating | 7562 | 7.19% |
| 4 | Diameter of 2000 mm and corrugations with width of 36 mm and depth of 1.3 mm, with coating | 8052 | 14.13% |
| 5 | Diameter of 2000 mm and corrugations with width of 36 mm and depth of 2 mm, without coating | 7614 | 7.92% |

Results show that the friction force of the surface of the drum can be increased by adding the corrugations as shown above on the surface the drum. However, in Group 5, the corrugations are overdeep, resulting in that the tyre is worn too quickly and noises are increased significantly. The drum from Group 1 is complicate in corrugations, great in machining difficulty and high in cost. Therefore, The drum prepared according to the technical solution provided by the present invention is improved in friction force on the basis that the machining complexity is reduced, and moreover, the defects of over-high wear speed of the tyre and excessive noise caused by overdeep corrugations are avoided.

On the basis of the test on Group 4, other conditions are maintained unchanged, and the depths are changed to be 1.1 mm (Group 6), 1.4 mm (Group 7) and 1.5 mm (Group 8). Tests are performed under the same conditions, and results show that compared with that of Group 1, the friction forces of all the drums are improved by more than 7%, and is enhanced with the increase in depth, and moreover, the situations of excessive tyre wear and sudden increase of noises do not turn up.

In a corrugation deepening process, the tyres are consequently worn too fast, and the noise are increased. However, for the drums from Groups 3 to 4 in Embodiment 1 of the present application, such problem is avoided by the combination of selected corrugation shape and depth. From test results of Group 5, it can be seen that the defects of over-high wear speed of tyre and excessive noises turn up while the depth is further increased. However, when the depth is within a small range or other surface structures are adopted, a higher friction force cannot be produced sufficiently. The inventors of the present application find out in surprise that on the basis of a preferable surface structure and corrugation depth, the above problems are overcome at the same time, without causing additional problems.

The inventors also find out the following facts in pleasant surprise. In Group 1, the drum is small in diameter and has a combination of big and small corrugations, without coating. In Group 2, the drum is large in diameter and has no corrugation, with coating added, and the lateral friction force is reduced by 1.67%. In Group 3, the drum is large in diameter and has combined arc corrugations, without coating, and the friction force is improved by 7.19/o. In Group 4, the drum is large in diameter and has combined arc corrugations, with coating, and the friction force is improved by 14.13%. It is obvious that the technical solution of Group 4 is obtained just by combining design elements of the technical solution of Group 2 with the design elements of the technical solution of Group 3. It is obvious that after the combination of Groups 2 and 3, the friction force is greatly improved beyond all expectations, and a significant cooperative effect is present between the corrugation shape and the wear-resistant alloy coating.

Embodiment 3

Life Test

The drums from all the groups described above are placed on the road simulating test bench and are made to rotate. In order to accelerate the test on the wear-resistant life, abrasion wheels in place of wheels are pressed on the surfaces of the drums, and other conditions are set the same as that of the friction force test.

The wear extents and forms of the surfaces of the drums are recorded after one minute.

Results show that the wears of the drums from Groups 2 and 4 are reduced significantly, as shown in Table 2 specifically.

TABLE 2

Life parameters of drums from Groups 1 to 5 and Group 9

| Group No. | Surface characteristics of drum | Wear thickness (mm) | Wear-resistant life multiplier (compared with Group 1) |
|---|---|---|---|
| 1 | Diameter of 1700 mm and big and small corrugations, without coating | 0.72 | |
| 2 | Diameter of 2000 mm and no corrugations, with coating | 0.14 | 5.14 |
| 3 | Diameter of 2000 mm and corrugations with width of 36 mm and depth of 1.3 mm, without coating | 0.7 | 1.03 |

TABLE 2-continued

Life parameters of drums from Groups 1 to 5 and Group 9

| Group No. | Surface characteristics of drum | Wear thickness (mm) | Wear-resistant life multiplier (compared with Group 1) |
| --- | --- | --- | --- |
| 4 | Diameter of 2000 mm and corrugations with width of 36 mm and depth of 1.3 mm, with coating | 0.22 | 3.27 |
| 5 | Diameter of 2000 mm and corrugations with width of 36 mm and depth of 2 mm, without coating | 0.85 | 0.85 |
| 9 | Diameter of 2000 mm and no corrugations, without coating | 0.55 | 1.31 |

Results show that the life of the drum can be prolonged significantly by adding the wear-resistant alloy coating on the surface of the drum.

The invention claimed is:

1. A drum of a wheel tester, comprising:
an outer surface of a drum comprises a plurality of cyclic corrugations, wherein the plurality of cyclic corrugation in one cycle on the outer surface comprise a concave arc and a convex arc, both of which are tangential in ends and equal in diameter; wherein one cycle is 30 to 50 mm in length and 1 to 1.5 mm in depth; and wherein the drum is formed of carbon steel.

2. The drum of the wheel tester according to claim 1, wherein a surface of the drum also comprises a wear-resistant alloy coating formed by electric arc spraying; and wherein the wear-resistant alloy coating is formed from a 7Cr13 solder wire by the electric arc spraying.

3. The drum of the wheel tester according to claim 2, wherein the wear-resistant alloy coating is 0.3 to 0.5 mm in thickness.

4. The drum of the wheel tester according to claim 1, wherein the drum is 1700 to 3200 mm in diameter and 400 to 600 mm in width.

5. The drum of the wheel tester according to claim 1, wherein the drum is 1800 to 2200 mm in diameter; a corrugation cycle is 30 to 50 mm in length; and the corrugations are 1.1 to 1.4 mm in depth.

6. The drum of the wheel tester according to claim 1, wherein the drum is 1900 to 2100 mm in diameter; a corrugation cycle is 32 to 42 mm in length; and the corrugations are 1.1 to 1.4 mm in depth.

7. The drum of the wheel tester according to claim 1, wherein the drum is 2000 mm in diameter; a corrugation cycle is 32 to 42 mm in length; and the corrugations are 1.3 mm in depth.

8. The drum of the wheel tester according to claim 1, wherein the drum is 2000 mm in diameter and 450 mm in width; a corrugation cycle is 36 mm in length; and the corrugations are 1.3 mm in depth.

9. The drum of the wheel tester according to claim 1, wherein the corrugations of the drum are 1.3 mm in depth and take a shape of a plurality of segments of smooth and tangential arcs, with arc radius being 62.63 mm.

10. The drum of the wheel tester according to claim 1, wherein the corrugations are parallel to a cross section of the drum.

* * * * *